(12) United States Patent
Bonnet et al.

(10) Patent No.: US 9,074,613 B2
(45) Date of Patent: Jul. 7, 2015

(54) METHOD AND DEVICE FOR ADJUSTING THE MASS FLOW RATE OF A GAS STREAM

(75) Inventors: Jean-Paul Bonnet, Poitiers (FR); Anton Lebedev, Lencloitre (FR); Eric Moreau, Vendeuvre (FR); Nicolas Benard, La Chapelle Mouliere (FR)

(73) Assignees: CENTRE NATIONAL DE LA RECHERCHE SCIENTIFIQUE—CNRS, Paris (FR); UNIVERSITE DE POITIERS, Poitiers (FR)

( * ) Notice: Subject to any disclaimer, the term of this patent is extended or adjusted under 35 U.S.C. 154(b) by 334 days.

(21) Appl. No.: 13/575,264

(22) PCT Filed: Jan. 26, 2011

(86) PCT No.: PCT/FR2011/050154
§ 371 (c)(1),
(2), (4) Date: Oct. 17, 2012

(87) PCT Pub. No.: WO2011/092429
PCT Pub. Date: Aug. 4, 2011

(65) Prior Publication Data
US 2013/0032218 A1    Feb. 7, 2013

(30) Foreign Application Priority Data

Jan. 27, 2010   (FR) ...................................... 10 00298

(51) Int. Cl.
| | |
|---|---|
| *F17D 1/02* | (2006.01) |
| *F15D 1/12* | (2006.01) |
| *B64C 23/00* | (2006.01) |
| *G05D 7/06* | (2006.01) |
| *H05H 1/24* | (2006.01) |

(52) U.S. Cl.
CPC ................ *F15D 1/12* (2013.01); *B64C 23/005* (2013.01); *G05D 7/0629* (2013.01); *H05H 1/24* (2013.01); *Y02T 50/166* (2013.01); *B64C 2230/18* (2013.01)

(58) Field of Classification Search
CPC ............. H05H 1/34; H05H 1/30; H05H 1/26; H05H 1/24; H01J 37/32
USPC ......... 137/828, 826, 803, 821, 13; 244/99.11, 244/99.12; 219/121.48, 121.5, 121.52, 219/121.36, 121.55; 315/111.21, 111.51; 313/231.41, 241.51

See application file for complete search history.

(56) References Cited

U.S. PATENT DOCUMENTS

| | | | | |
|---|---|---|---|---|
| 2,916,873 | A | * | 12/1959 | Walker ...................... 239/265.17 |
| 3,566,896 | A | * | 3/1971 | Proniewicz et al. .......... 137/828 |
| 3,946,332 | A | * | 3/1976 | Samis ............................. 372/56 |

(Continued)

FOREIGN PATENT DOCUMENTS

| | | |
|---|---|---|
| EP | 1 623 922 A1 | 2/2006 |
| EP | 1 672 966 A2 | 6/2006 |
| FR | 2 532 081 A1 | 2/1984 |

*Primary Examiner* — John K Fristoe, Jr.
*Assistant Examiner* — Minh Le
(74) *Attorney, Agent, or Firm* — Arent Fox LLP

(57) ABSTRACT

The invention relates to a method and device for controlling the mass flow rate of a sonic gas stream in a pipe. To carry out the above operation, an electric discharge is applied inside the pipe so as to create a plasma in the pipe. The electric discharge allows for an increase in the temperature of the gas stream and thus a variation in the mass flow rate or the pressure of the gas stream. By periodically emitting the electric discharge, a pulsed or adjustable gas jet is obtained at the outlet of the device. The gas jet can then be used to control a main stream.

18 Claims, 1 Drawing Sheet

(56) References Cited

U.S. PATENT DOCUMENTS

| | | | |
|---|---|---|---|
| 4,339,782 A * | 7/1982 | Yu et al. | 96/62 |
| 4,417,293 A * | 11/1983 | Larigaldie | 361/212 |
| 4,435,190 A * | 3/1984 | Taillet et al. | 95/61 |
| 4,449,159 A * | 5/1984 | Schwab et al. | 96/62 |
| 4,544,382 A * | 10/1985 | Taillet et al. | 96/27 |
| 4,577,461 A * | 3/1986 | Cann | 60/203.1 |
| 4,617,483 A * | 10/1986 | Marks | 310/10 |
| 4,882,465 A * | 11/1989 | Smith et al. | 219/121.48 |
| 4,907,407 A * | 3/1990 | Simon et al. | 60/203.1 |
| 4,909,914 A | 3/1990 | Chiba et al. | |
| 4,926,632 A * | 5/1990 | Smith et al. | 60/203.1 |
| 4,995,231 A * | 2/1991 | Smith et al. | 60/203.1 |
| 5,111,656 A * | 5/1992 | Simon et al. | 60/203.1 |
| 5,519,991 A * | 5/1996 | Butler | 60/203.1 |
| 5,573,682 A * | 11/1996 | Beason et al. | 219/121.5 |
| 5,640,843 A * | 6/1997 | Aston | 60/203.1 |
| 5,690,145 A * | 11/1997 | Kuklinski et al. | 137/828 |
| 5,901,551 A * | 5/1999 | Butler | 60/203.1 |
| 6,360,763 B1 * | 3/2002 | Narayanan et al. | 137/13 |
| 7,477,008 B2 * | 1/2009 | Artmann et al. | 313/143 |
| 7,509,795 B2 * | 3/2009 | Allen | 60/202 |
| 8,038,102 B2 * | 10/2011 | Miller et al. | 244/207 |
| 8,251,312 B1 * | 8/2012 | Daso et al. | 244/130 |
| 2002/0195526 A1 | 12/2002 | Barrett et al. | |
| 2003/0047540 A1 * | 3/2003 | Konavko et al. | 219/121.4 |
| 2006/0131282 A1 | 6/2006 | Miller et al. | |
| 2006/0150611 A1 * | 7/2006 | Allen | 60/203.1 |
| 2007/0119827 A1 | 5/2007 | Miller et al. | |
| 2010/0126605 A1 * | 5/2010 | Stones | 137/565.23 |
| 2010/0237165 A1 * | 9/2010 | Krueger | 239/11 |
| 2011/0089835 A1 | 4/2011 | Miller et al. | |
| 2012/0143183 A1 * | 6/2012 | Suslov | 606/45 |

* cited by examiner

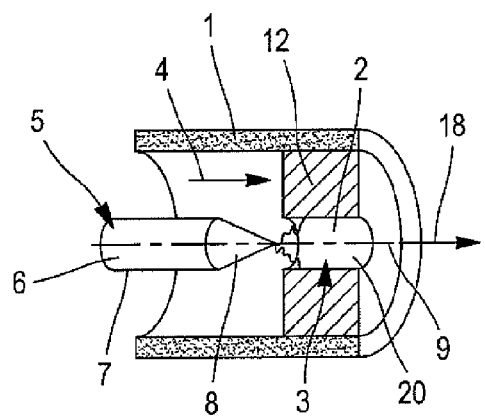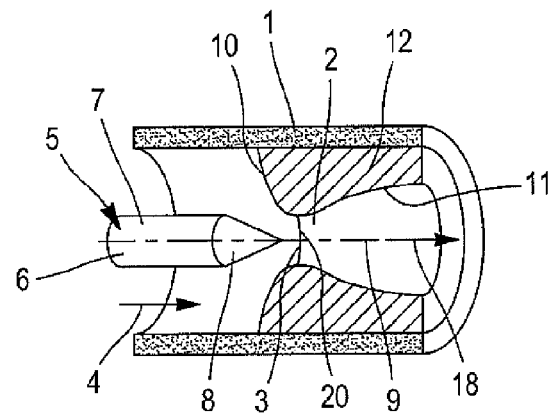
FIG. 1    FIG. 2
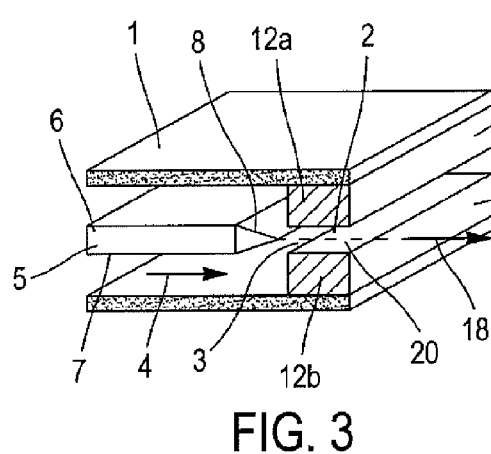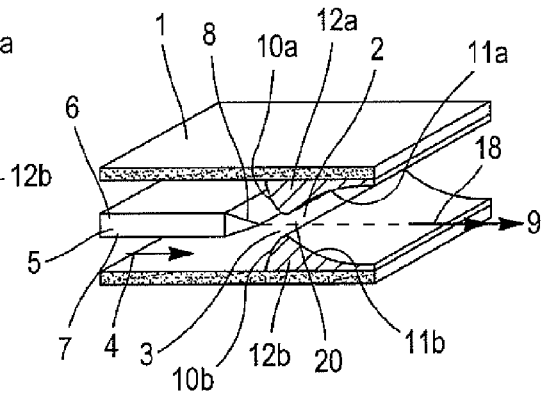
FIG. 3    FIG. 4
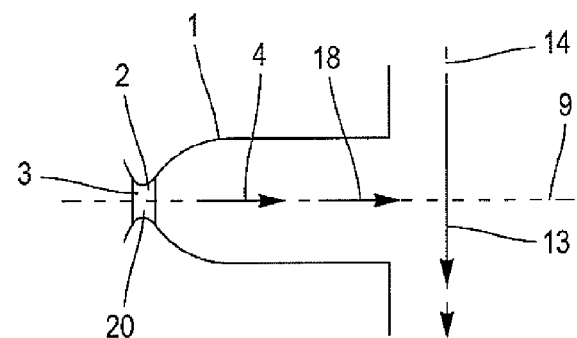
FIG. 5

METHOD AND DEVICE FOR ADJUSTING THE MASS FLOW RATE OF A GAS STREAM

CROSS-REFERENCE TO RELATED APPLICATION

This Application is a National Stage entry of International Application No. PCT/FR2011/050154, having an international filing date of Jan. 26, 2011; which claims priority to French Application No.: 1000298, filed Jan. 27, 2010; the disclosure of each of which is hereby incorporated in its entirety by reference.

TECHNICAL FIELD OF THE INVENTION

The invention relates to a method and a device for adjusting the mass flow rate of a gas stream.

PRIOR ART

In the aeronautics field, it has been known to use gas jets for controlling a stream. Thus, documents US2002/0195526 or EP1623922 describe the use of pulsed actuators emitting gas micro-jets to control streams. These gas micro-jets particularly make it possible to control the shape, direction, section and even the envelope of the streams.

For this, different types of actuators are known. For example, there has been known actuators with synthetic jets such as described in document US2002/0195526. However, these actuators do not make it possible to produce high speed micro-jets.

There has also been known of actuators which operate using valves. These actuators may produce micro-jets having a high outlet speed but cannot work at high frequency.

Furthermore, due to moving portions, the actuators of the prior art wear out quickly. However, they do not make it possible to work at high frequency and great speed, which is required for wind tunnel tests and certain aeronautical and automobile applications.

SUMMARY OF THE INVENTION

The invention aims to remedy to the drawbacks of the prior art by proposing a method and an actuator able to produce a pulsed air jet at high speeds and frequencies.

The invention also aims to propose an actuator that is wear-resistant and which does not comprise any moving mechanical part.

The invention also aims to propose an easily miniturizable actuator.

Another object of the invention is to propose a method for controlling a stream that is easy and not costly to implement.

In this regard, is proposed according to a first aspect of the invention a method for controlling a gas stream, which comprises the following steps:
  establishing a gas stream through a channel, the channel comprising a pipe wherein the Mach number of the gas stream is equal to 1,
  emitting at least an electrical discharge in the pipe such as to create at least a plasma area in the gas stream.

Advantageously, the plasma area is created in the pipe, wherein the Mach number is equal to one.

In fact, in a sonic stream, i.e., a stream whereof the Mach number is equal to one, the mass flow rate of the gas stream varies with the temperature of the gas. More precisely, in a sonic stream, the mass flow rate is inversely proportional to the square root of the temperature. Thus, an electrical discharge, when it is emitted in the gas stream, creates a plasma area and causes a rise in the temperature of the gas stream. The creation of this plasma area thus makes it possible to make the mass flow rate of the gas stream in the pipe vary.

Thus, by controlling the electrical discharge emitted in the sonic gas stream, one may easily control the mass flow rate of the gas stream. The method according to the invention hence makes it possible to produce a gas jet at the outlet of the pipe whereof the mass flow rate is modulated. The modulation of this mass flow rate may occur at high frequencies and the flow rate of this gas jet may also be high.

The gas stream at the inlet of the pipe is preferably permanent.

Advantageously, the pipe is formed by a narrowing of the channel wherein the gas stream exhibits a Mach number equal to 1. This narrowing is also called "throat" or "sonic throat" since the Mach number of the gas stream in this narrowing is equal to one. The fact of being placed in this throat makes it possible to precisely control the stream conditions.

The method according to the invention allows for a modulation of 30 to 60% of the mass flow rate. Surprisingly, it is worth noting that the variation of the mass flow rate according to the invention following a given energy discharge is greater than the expected flow rate variation for such an involved energy (relatively low).

Advantageously, the electrical discharge is such that the temperature of the gas stream in the pipe varies from 60% to 120% during the electrical discharge.

According to different embodiments of the invention:
  the electrical discharge has a duration greater than $10^{-7}$ s. In fact, this duration makes it possible to transfer a thermal energy essential for the stream over very short periods; the response times are thus fixed by the stream dynamic, which is very rapid since the considered speeds are sonic;
  the electrical discharge is periodic and exhibits a frequency ranging between 1 Hz and 50 kHz thus making it possible to pulse the gas stream at the outlet of the device according to the invention at frequencies used in aeronautics;
  the gas stream has a mass flow rate ranging between 1 g/second and 100 g/second.

The invention also relates to a method for controlling a main stream which comprises the following steps:
  establishing a gas stream through a channel, the channel comprising a pipe wherein the Mach number of the gas stream is equal to 1,
  emitting at least an electrical discharge in the pipe such as to create at least a plasma area in the gas stream,
  directing the gas stream at the outlet of the channel towards a main stream flowing in a given main direction, by orienting the gas stream at the outlet of the channel such that the flow direction of the gas stream at the outlet of the channel be secant or parallel to/with the main direction,
  controlling the main flow by making the mass flow rate of the gas stream in the channel vary.

In this embodiment, the gas stream, whereof the mass flow rate is modulated, is used to control another stream, called main stream. In fact, the gas stream is injected in the main stream which makes it possible, by varying the mass flow rate of the gas stream, for example at a selected frequency, to control the main stream and particularly its separation, its direction and even its shape as well as the noise or vibrations emitted by the main stream.

In this document, the words "upstream" and "downstream" refer to the flow direction of the gas stream.

The invention also relates to a device for modulating the mass flow rate of a gas stream, the device comprising a channel comprising a pipe sized such that the gas stream in the pipe be sonic, the device further comprising means for emitting at least an electrical discharge into the pipe, the electrical discharge being able to create a plasma area in the gas stream.

The fact of creating a plasma makes it possible to have a rapid and volumic increase of the temperature. This increase in temperature causes a variation of the mass flow rate of the gas stream in the pipe since the gas stream is sonic in the pipe.

Advantageously, the electrical discharge is filamentary or diffuse or in arc regime.

Advantageously, the pipe is constituted of a narrowing of the channel, the gas stream exhibiting a Mach number equal to 1 in the pipe.

Advantageously, the means for emitting the electrical discharge are positioned such as to create the plasma area in the pipe.

According to a preferential embodiment of the invention, the device further comprises controlling means able to pilot the means for emitting the electrical discharge such that the electrical discharge emitting means periodically emit an electrical discharge. Thus, the device according to the invention makes it possible to produce a pulsed gas stream at a selected frequency or to adopt any temporal evolution on demand (duty-cycle, non sinusoidal shapes).

According to different embodiments:
- the electrical discharge has a voltage ranging between 1 kV and 50 kV and a mean intensity ranging between 1 mA and 500 mA;
- the electrical discharge emitting means comprise a first electrode located in the center of the pipe and a second electrode constituted by the internal surface of the pipe; these means for creating the electrical discharge are particularly simple to achieve;
- the pipe and the first electrode each exhibit a circular transversal section, thus making it possible to have an increase in homogenous temperature;
- the channel exhibits a diameter ranging between 0.5 mm and 3 mm, thus making it possible to produce gas microjets at the outlet of the channel whereof the diameter ranges between 0.5 mm and 3 mm, thus making it possible to use these micro-jets for controlling separations on automobiles or planes;
- the channel exhibits a rectangular transversal section which is particularly advantageous when the device is used in aeronautics and in particular for airplane wings since, thus, it exhibits minimum bulk.

The method and device according to the invention hence make it possible to produce pulsed jets at great speed, i.e., whereof the speed is close to the speed of sound.

The electric energies involved to produce the electrical discharge essential for the modulation of micro-jets with a flow rate of the order of the gram per second are of the order of 100 W, able to reach 1000 W maximum.

The method and device according to the invention hence make it possible to produce pulsed jets at high frequencies.

The invention also relates to the use of a device such as previously described for controlling a main stream, the main stream flowing in a main flow direction, the device emitting a gas jet in a flow direction secant to the main flow direction, or parallel to said main stream or even located in a judiciously selected region of the main stream so as to modify the temporal behavior, the mass flow rate of the gas jet being modulated by the device.

BRIEF DESCRIPTION OF THE DRAWINGS

Other characteristics and advantages of the invention will appear upon reading the following description, with reference to the accompanying drawings, which illustrate:

FIG. 1, a perspective schematic view of a longitudinal cross-section of a device according to a first embodiment of the invention;

FIG. 2, a perspective schematic view of a longitudinal cross-section of a device according to a second embodiment of the invention;

FIG. 3, a perspective schematic view of a longitudinal cross-section of a device according to a third embodiment of the invention;

FIG. 4, a perspective schematic view of a longitudinal cross-section of a device according to a fourth embodiment of the invention;

FIG. 5, a block diagram of a method for controlling a stream according to an embodiment of the invention.

For more clarity, the identical or similar elements are identified by identical reference numerals on the set of figures.

DETAILED DESCRIPTION OF AN EMBODIMENT

The device of FIG. 1 comprises a channel of cylindrical section. This channel 1 comprises a pipe 3. The pipe 3 is constituted by a narrowing 20 of the channel 1. This narrowing 20 is also called throat or sonic throat.

More precisely, the pipe 3 is formed by a cylindrical ring 12 with an inner diameter lower than the inner diameter of the channel 1 such that the pipe 3 constitutes a narrowing of the channel 1. The channel 1 and the pipe 3 are crossed by a gas stream 4 which flows in a flow direction 9. The gas stream 4 is permanent.

The gas stream 4 and the pipe 3 are selected such that the Mach number of the gas stream be equal to 1 in the pipe 3. In this example, the gas stream is an air flow. The device further comprises means for emitting an electrical discharge 5. The means 5 for emitting an electrical discharge are constituted here on the one hand of an electrode 6 placed in the centre of the channel 1 and aligned with the flow direction 9 and on the other hand with the pipe 3 walls which are preferably constituted of steel. The electrode 6 is preferably constituted of tungsten. Steel and tungsten have been selected to be able to resist erosion. The electrode 6 is constituted of a cylindrical body 7 at the end of which is mounted a tip 8. The electrode 6 is placed such as to create a plasma area 2 in the pipe 3.

In the absence of an electrical discharge, the gas stream 4 permanently crosses the pipe 3 such that the Mach number of the gas stream 4 in the pipe is equal to 1.

When an electrical discharge is emitted by the emission means, a plasma area 2 is created in the pipe 3, thus modifying the temperature and the mass flow rate of the gas stream 4. The electrical discharge emission means 5 are linked to controlling means which pilot the emission means such that the emission means 5 periodically emit an electrical discharge. Thus, at the outlet of the channel 1 a pulsed gas jet 18 is obtained whereof the mass flow rate is modulated. In this example, the gas jet 18 has a diameter of 1 mm in diameter. The mass flow rate of the gas jet 18 at the outlet of the device varies by 30% between the moment when there is no electrical discharge and the moment an electrical discharge is emitted. Therefore, the power used for the filamentary electrical discharge is of the order of 100 W, with a maximum value of 1000 W. This discharge may be filamentary, with a diameter of about 100 mm, or diffuse. In this case, its diameter is equal to the diameter of the outlet jet. The current used for emitting such a discharge has a voltage of about 5 kV and a mean intensity usually of around twenty milliampers, able to reach several hundred milliampers.

This device makes it possible to control a gas stream, and particularly its mass flow rate simply, and reliably. Furthermore, this device makes it possible to emit a pulsed gas jet at a very high frequency. Furthermore, this device makes it possible to pulse a gas jet without using a mechanical component and consequently, it is wear resistant and is easily miniturizable.

This device also makes it possible to save energy.

FIG. 2 represents a device according to another embodiment of the invention. The device of FIG. 2 also comprises a channel 1 of cylindrical section. This channel 1 comprises a pipe 3. The pipe 3 is formed by the narrowing of the channel 1. For this, the pipe 3 is formed by a ring 12 of asymmetrical longitudinal section. This ring 12 having an inner diameter that is lower than the inner diameter of the channel 1 such that the pipe 3 constitutes a narrowing of the channel 1. The channel 1 and the pipe 3 are crossed by a gas stream 4 which flows in a flow direction 9. In this embodiment, the ring 12 exhibits a first side 10 with a very steep slope which faces the flow and a second side 11 with a less significant slope so much so that when one moves inside the pipe by following the gas flow direction, the channel 1 first exhibits a very sudden narrowing up to the pipe then a gradual widening starting from the pipe 3. The pipe 3 is located in the narrowest portion of the ring 12. This device also comprises electrical discharge emission means 5. The electrical discharge emission means 5 are constituted on the one hand by an electrode 6 placed in the center of the channel 1 and aligned with the flow direction 9 and on the other hand with the pipe 3 walls which are made of steel. The electrode 6 is preferably constituted of tungsten. Steel and tungsten have been selected so as to resist the erosion. The electrode 6 is constituted of a cylindrical body 7 at the end of which is mounted a tip 8. The electrode 6 is placed such as to create a plasma area 2 in the pipe 3.

FIG. 3 represents a device according to another embodiment wherein the gas stream 4 occurs in a channel 1 exhibiting a rectangular longitudinal section and a rectangular transversal section. Within this channel 1 are two pillars 12a and 12b of rectangular longitudinal section. The two pillars 12a and 12b are located over each other such as to form a narrowing 20 of the channel 1 wherein is found the pipe 3. The device of FIG. 3 further comprises electrical discharge emission means 5. The electrical discharge emission means 5 are constituted on the one hand by an electrode 6 placed in the center of the channel 1 and on the other hand by the pipe 3 walls that are preferably constituted of steel. The electrode 6 is preferably constituted of tungsten. The electrode 6 is constituted of a parallelepiped body 7 at the end of which is mounted a pyramid-shaped tip 8. The electrode 6 is placed such as to create a plasma in the pipe 3.

FIG. 4 represents a device according to another embodiment wherein the gas stream 4 occurs in a channel 1 which exhibits a rectangular longitudinal section and a rectangular transversal section. The gas stream 4 flows in a flow direction 9. Inside this channel 1 are two pillars 12a and 12b of asymmetrical longitudinal sections. The two pillars 12a and 12b each exhibit a side 10a and 10b facing the gas stream 4 and whereof the slope is very important and a side 11a and 11b with a less significant slope. The two pillars 12a and 12b are located over each other such as to form a narrowing of the channel 1 wherein the pipe 3 is found. Thus, when one moves in the channel 1 in the direction of the gas flow, the channel first narrows very rapidly up to pipe 3 then widens again starting from the pipe 3 but in a more gradual manner. The device of FIG. 4 further comprises electrical discharge emission means 5. The electrical discharge emission means 5 are constituted on the one hand by an electrode 6 placed in the centre of the channel 1 and on the other hand by the walls of the pipe 3 that are preferably constituted of steel. The electrode 6 is preferably constituted of tungsten. The electrode 6 is constituted of a parallelepiped body 7 at the end of which is mounted a pyramid-shaped tip 8. The electrode 6 is placed such as to create a plasma in the pipe 3.

FIG. 5 schematically illustrates a method for controlling a main stream 13 according to an embodiment of the invention. The main stream 13 flows in a main flow direction 14. In this controlling method, a gas stream 4 flows in a flow direction 9 and crosses a pipe 3 located in a channel 1. The channel 1 comprises a pipe 3 formed by a narrowing 20 wherein the Mach number of the flow is equal to one. The gas stream 4 and the pipe 3 are oriented such that the flow direction 9 be secant to the main flow direction 14, and more precisely such that the flow direction 9 be perpendicular to the main flow direction 14; in other applications the flow direction 9 may be parallel to the main flow direction 14; in other applications still, the flow direction 9 may have orientations selected according to the characteristics of the flow 14 in their maximum sensitivity to disturbances.

For example, when the controlling method according to the invention is used for controlling the separation on a wing, the flow direction 9 is preferably selected such that it be perpendicular to the main flow direction 14.

When the controlling method according to the invention is used for controlling the noise of the jet, the flow direction 9 is preferably selected such that it be quasi-parallel at the trailing edge of the stream or such that the angle between the flow direction and the main flow direction be less than 50°.

When the controlling method according to the invention is used for controlling a cavity flow, the device according to the invention is preferably placed in the hollow of the flow.

Finally the controlling method according to the invention comprises a periodic step of emitting an electrical discharge such as to periodically create a plasma area 2 in the pipe 3. This plasma area 2 makes it possible to periodically modulate the mass flow rate of the gas stream 4, so much so that at the outlet of the channel 1, a pulsed gas jet 18 is obtained at a frequency equal to the electrical discharge transmission frequency. This pulsed gas jet 18 collides with the main stream 13 thus, making it possible to modify the shape, direction, separation and even the envelope of the main stream 13.

The invention claimed is:

1. A method for controlling a mass flow rate of a gas stream, the method comprising:
    establishing a gas stream through a channel, the channel comprising a pipe, wherein the Mach number of the gas stream is equal to 1, such that the gas stream is permanent upstream from the pipe;
    emitting at least a periodic electrical discharge in the pipe to create at least a plasma area in the gas stream; and
    controlling the mass flow rate of the downstream flow from the pipe by the electrical discharge via a temperature increase of the gas stream.

2. The method according to claim 1, wherein the pipe is formed by a narrowing of the channel, and the gas stream exhibits a Mach number equal to 1.

3. The method according to claim 1, wherein the electrical discharge has a duration higher than $10^{-7}$ s.

4. The method according to claim 1, wherein the electrical discharge has a frequency ranging between 1 Hz and 50 kHz.

5. The method according to claim 1, wherein the gas stream has a mass flow rate in the channel ranging between 1 g/second and 100 g/second.

6. The controlling method according to claim 1, further comprising:
   directing the gas stream at an outlet of the channel towards a main stream flowing in a given main direction, by orienting the gas stream at the outlet of the channel such that the flow direction of the gas stream at the outlet of the channel is secant or parallel to the main direction; and
   controlling the main stream by varying the mass flow rate of the gas stream in the channel.

7. A device for modulating a mass flow rate of a gas stream, the device comprising:
   a channel comprising a pipe sized such that a speed of the gas stream in the pipe is equal to 1 Mach and that the flow is permanent upstream from the pipe; and
   means for emitting at least a periodic electrical discharge in the pipe, the electrical discharge creating a plasma area in the gas stream,
   wherein the device is configured to control the mass flow rate of the flow downstream from the pipe via an increase in temperature of the gas stream.

8. The device according to claim 7, wherein the pipe is constituted by a narrowing of the channel, the gas stream exhibiting a Mach number equal to 1 in the pipe.

9. The device according to claim 7, wherein the device is configured to control the means for emitting the electrical discharge such that the electrical discharge is emitted periodically.

10. The device according to claim 9, wherein the electrical discharge has a voltage ranging between 1 kV and 50 kV and an intensity ranging between 1 mA and 500 mA.

11. The device according to claim 7, wherein the means for emitting the electrical discharge comprises a first electrode located in a center of the pipe and a second electrode constituted by an internal surface of the pipe.

12. The device according to claim 11, wherein each of the pipe and the first electrode has a circular transversal section.

13. The device according to claim 12, wherein the channel has a diameter ranging between 0.5 mm and 3 mm.

14. The device according to claim 11, wherein the channel has a rectangular transversal section.

15. A usage of a device according to claim 7 for controlling a main stream, the main stream flowing in a main flow direction, the device emitting a gas jet in a flow direction that is secant or parallel to the main flow direction, the mass flow rate of the gas jet being modulated by the device.

16. The device according to claim 10, wherein the means for emitting the electrical discharge comprises a first electrode located in a center of the pipe and a second electrode constituted by an internal surface of the pipe.

17. The device according to claim 16, wherein each of the pipe and the first electrode has a circular transversal section.

18. The device according to claim 17, wherein the channel has a diameter ranging between 0.5 mm and 3 mm.

* * * * *